United States Patent
Beale et al.

(10) Patent No.: US 10,380,277 B2
(45) Date of Patent: Aug. 13, 2019

(54) APPLICATION OF VIRTUAL MONITORING OF LOADS

(71) Applicant: Sikorsky Aircraft Corporation, Stratford, CT (US)

(72) Inventors: Raymond Joseph Beale, Stratford, CT (US); Mark W. Davis, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 338 days.

(21) Appl. No.: 15/122,123

(22) PCT Filed: Mar. 2, 2015

(86) PCT No.: PCT/US2015/018331
§ 371 (c)(1),
(2) Date: Aug. 26, 2016

(87) PCT Pub. No.: WO2015/131193
PCT Pub. Date: Sep. 3, 2015

(65) Prior Publication Data
US 2017/0017736 A1  Jan. 19, 2017

Related U.S. Application Data

(60) Provisional application No. 61/946,123, filed on Feb. 28, 2014.

(51) Int. Cl.
G05B 23/02 (2006.01)
G06F 17/50 (2006.01)
G06Q 10/00 (2012.01)

(52) U.S. Cl.
CPC ..... *G06F 17/5009* (2013.01); *G05B 23/0283* (2013.01); *G06Q 10/20* (2013.01); *G06F 2217/16* (2013.01)

(58) Field of Classification Search
CPC . G06F 17/5009; G06F 2217/16; G06Q 10/20; G05B 23/0283
USPC .......................................................... 703/2
See application file for complete search history.

(56) References Cited

U.S. PATENT DOCUMENTS

| 857,814 A | 6/1907 | Lippincott |
| 8,019,504 B2 * | 9/2011 | Jamrosz ................. G06Q 50/30 701/3 |
| 8,571,814 B2 * | 10/2013 | Zhao ..................... G06Q 10/04 702/34 |

(Continued)

OTHER PUBLICATIONS

PCT International Search Report and Written Opinion; International Application No. PCT/US15/18331; International Filing Date: Mar. 2, 2015; dated Jun. 16, 2015; pp. 1-18.

*Primary Examiner* — Saif A Alhija
(74) *Attorney, Agent, or Firm* — Cantor Colburn LLP

(57) ABSTRACT

A system and method for an application of a virtual load monitoring of an aircraft to determine a component retirement time for at least one component of the aircraft is provided. The system and method includes estimating component loads from aircraft state parameters; calculating load statistics from the component loads; calculating a reliability factor; generating a component design load spectrum by applying the reliability factor to the load statistics; and calculating the component retirement time for the at least one component of the aircraft by utilizing the component design load spectrum.

14 Claims, 4 Drawing Sheets

(56) References Cited

U.S. PATENT DOCUMENTS

2010/0161244 A1   6/2010  Ghoshal et al.
2011/0112878 A1*  5/2011  Isom ................ G06Q 10/06311
                                                             705/7.13
2013/0218368 A1   8/2013  Kokes et al.

* cited by examiner

APPLICATION OF VIRTUAL MONITORING OF LOADS

CROSS REFERENCE TO RELATED APPLICATIONS

This application is the National Stage of International Application No. PCT/US15/18331, filed Mar. 2, 2015, which claims priority to U.S. Provisional Application 61/946,123 filed Feb. 28, 2014.

BACKGROUND OF THE INVENTION

The disclosure relates generally to virtual monitoring of loads, and more specifically, to extracting meaningful and reliable load information from a fleet and corresponding fleet database to realize maintenance benefits.

Generally, load monitoring through either measurement by physical sensor(s) or virtual monitoring of loads, using load estimation and validation methods, are enabling technologies in structural design, flight control, and fleet management. However, loads monitoring, especially virtual monitoring of loads, has yet to be leveraged in downstream processes to provide real value, while maintaining safety and reliability, to original equipment manufacturers, customers, and operators. The lack of effectively leveraged load monitoring by physical sensors is indicative of perceived difficulties, increased weight, and reliability issues associated with deploying the many physical sensors that would be required to monitor all such local loads, especially in rotor systems. Effectively leveraged virtually monitoring of loads in downstream processes has also been inhibited by perceived difficulties such as insufficient accuracy of these methods.

BRIEF DESCRIPTION OF THE INVENTION

According to one aspect of the invention, a method for an application of a virtual load monitoring of an aircraft to determine a component retirement time for at least one component of the aircraft is provided. The method includes estimating component loads from aircraft state parameters; calculating load statistics from the component loads; calculating a reliability factor; generating a component design load spectrum by applying the reliability factor to the load statistics; and calculating the component retirement time for the at least one component of the aircraft by utilizing the component design load spectrum.

In addition to one or more of the features described above, or as an alternative, further embodiments may include, wherein the estimating of the components loads further comprises: inputting historical aircraft state parameters and associated measured dynamic loads into a model; utilizing the measured dynamic loads to calculate dynamic mode shapes and dynamic mode coefficients associated with the measured dynamic loads and the historical aircraft state parameters; tracking aircraft state parameters; and estimating dynamic loads based on the aircraft state parameters via the calculated dynamic mode shapes and dynamic mode coefficients to produce the components loads.

In addition to one or more of the features described above, or as an alternative, further embodiments may include, wherein the estimating of the components loads further comprises: applying a correction factor to the component loads to account for estimation model uncertainty to produce corrected estimated component loads, the corrected estimated component loads being utilized as the component loads for calculating the load statistics.

In addition to one or more of the features described above, or as an alternative, further embodiments may include, wherein the method further comprises: statistically analyzing the component loads for a plurality of serial numbers for the at least one component; calculating the reliability factor based on the component loads for each serial number of the plurality of serial numbers; calculating a component load spectrum for each serial number of the plurality of serial numbers; calculating accumulated fatigue damage for each serial number of the plurality of serial numbers; and calculating a retirement time and remaining useful life for each serial number of the plurality of serial numbers.

In addition to one or more of the features described above, or as an alternative, further embodiments may include, wherein the component design load spectrum is generated from estimated component load statistics for a plurality of components of the aircraft the load statistics correspond to a plurality of components of the aircraft to produce component load statistics.

In addition to one or more of the features described above, or as an alternative, further embodiments may include, wherein the generating of the component design load spectrum the plurality of components further comprises: organizing data according to a plurality of component part numbers; calculating component load statistics for each part number of the plurality of component part numbers; calculating a reliability factor based on the of the component load statistics for each part number of the plurality of component part numbers; generating the component design load spectrum for each part number of the plurality of component part numbers by applying the reliability factor to derive a fleet worst case component load spectrum for each part number; and applying the component design load spectrum to determine the component retirement time for each part number.

In addition to one or more of the features described above, or as an alternative, further embodiments may include, wherein the component design load spectrum is compared to a design usage spectrum to derive a new design usage spectrum.

In addition to one or more of the features described above, or as an alternative, further embodiments may include, wherein the component design load spectrum is generated from measured loads from a physical sensor for at least one component or part number.

In addition to one or more of the features described above, or as an alternative, further embodiments may include, wherein the load statistics are partitioned to correspond to one or more regimes, wherein the one or more regimes are defined by ranges of the aircraft state parameters.

In addition to one or more of the features described above, or as an alternative, further embodiments may include, wherein the partitioned load statistics include partitions corresponding to different aircraft gross weight or center of gravity categories.

In addition to one or more of the features described above, or as an alternative, further embodiments may include, wherein the reliability factor is calculated from the load statistics for one or more regime.

In addition to one or more of the features described above, or as an alternative, further embodiments may include, wherein the component design load spectrum for the at least one component is generated by applying a plurality of reliability factors to derive a fleet worst case component load spectrum corresponding to a plurality of regimes.

According to another aspect of the invention, a system for an application of a virtual load monitoring of an aircraft to determine a component retirement time for at least one component of the aircraft is provided. The system includes a processor, which is configured to perform operations that comprise estimating component loads from aircraft state parameters; calculating load statistics from the component loads; calculating a reliability factor; generating a component design load spectrum by applying the reliability factor to the load statistics; and calculating the component retirement time for the at least one component of the aircraft by utilizing the component design load spectrum.

In addition to one or more of the features described above, or as an alternative, further embodiments may include, wherein the processor configured to perform the estimating of the components loads by operations comprising: inputting historical aircraft state parameters and associated measured dynamic loads into a model; utilizing the measured dynamic loads to calculate dynamic mode shapes and dynamic mode coefficients associated with the measured dynamic loads and the historical aircraft state parameters; tracking aircraft state parameters; and estimating dynamic loads based on the aircraft state parameters via the calculated dynamic mode shapes and dynamic mode coefficients to produce the components loads.

In addition to one or more of the features described above, or as an alternative, further embodiments may include, wherein the load statistics correspond to a plurality of components of the aircraft to produce component load statistics.

These and other advantages and features can become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
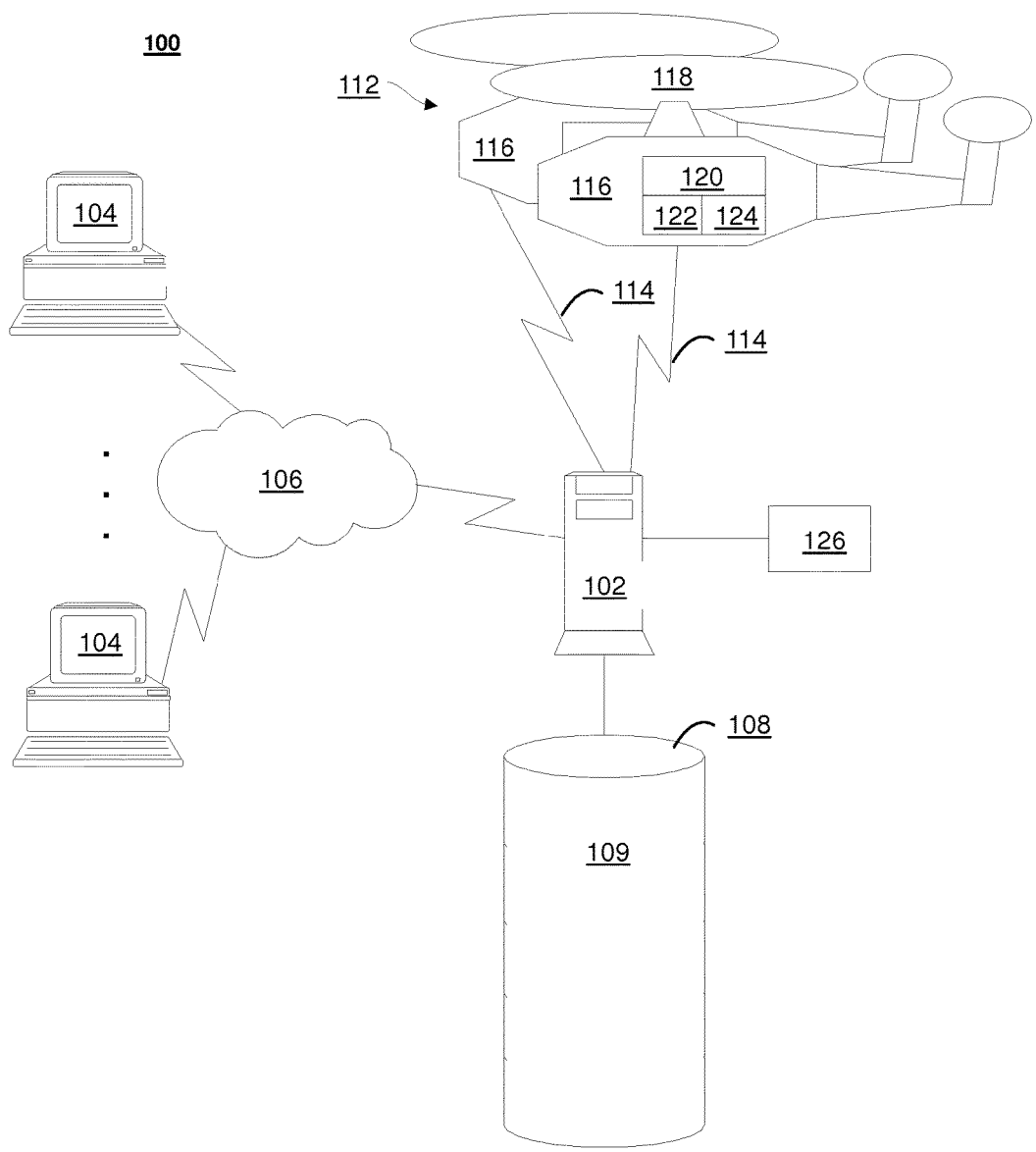
FIG. 1 illustrates a usage and loads based maintenance system.

As indicated above, there is a lack of effectively leveraged load estimation and validation methods in downstream processes. Embodiments of the present invention focuses on a mechanisms for leveraging virtual monitoring of loads methods, while addressing these perceived difficulties, and more particularly a system, method, and/or computer program product configured to estimate actual load waveforms by performing a virtual monitoring of loads on data from health and usage monitoring systems (HUMS).

In general, the embodiments disclosed herein may include a usage and loads based maintenance system, method, and/or computer program product ("ULBM system") that optimally estimate and/or measure load information from a fleet and/or corresponding fleet database while ensuring data quality, identifying questionable load events for engineer review, and reducing calculated load time histories into individual tail number load spectrums. In this way, the ULBM system extracts meaningful and reliable load information from the fleet and the corresponding fleet database to realize maintenance benefits (e.g., credits if done calculated for a specific serial number with respect to a published life for the associated part number), such as extending retirement times of life limited components, while ensuring airworthiness and flight safety, by reducing calculated time histories into individual tail number usage and load spectrums, calculating new retirement times, and conducting process audits of any maintenance credits.

Loads include the static or dynamic characteristics (e.g., stress, strain, displacement, acceleration) encountered by a vehicle (e.g., rotorcraft) and/or components thereof. As used in this specification, the term "load" encompasses the loads themselves (e.g., mechanical loads, electromechanical loads, electromagnetic loads, etc.) as well as responses (e.g., structural responses, electromechanical responses, electromagnetic responses, optical responses, etc.) to a load; therefore, load signals may indicate, for example, force, moment, torque, stress, strain, current, and/or voltage. Note that the nominal (e.g., healthy) static and dynamic characteristics of loads are also strongly influenced by the operating state of the vehicle.

HUMS comprise data collection, analysis, and storage techniques that ensure availability, reliability and safety of vehicles. The data from the HUMS includes parametric information that indicates a state of a vehicle, such as pilot controls, vehicle speed, roll angle, etc. Further, it has been shown that load information can be inferred or estimated from the state parameters (parametric data) collected by HUMS and/or other aircraft data recording devices. Finally, it has been shown that actual aircraft loads can be used to extract benefit by more cost effective or less burdensome maintenance (e.g., leave parts on longer). In view of a rotorcraft example, the actual load waveforms can be derived from data from the HUMS to derive benefits, such as new torque spectrum for a tail rotor drive system of the rotorcraft. Then, the new torque spectrum may be tied to specific critical regimes to further derive more accurate load life calculations of parts and components of the rotorcraft. With these more accurate load life calculations, more accurate and effective maintenance is enabled to reduced mission aborts and fewer aircraft on ground, along with optimized logistics for fleet deployment.

FIG. 1 is an example of a ULBM system 100 for applying virtual monitoring of vehicle loads to achieve maintenance benefits (herein discussed with respect to an aircraft). The ULBM system 100 includes a computing sub-system 102 in communication with remote sub-systems 104 over a network 106. The computing sub-system 102 can access a database 108 to read and write data 109 in response to requests from the remote sub-systems 104.

The computing sub-system 102 is a computing device (e.g., a mainframe computer, a desktop computer, a laptop computer, or the like) including at least one processing circuit (e.g., a CPU) capable of reading and executing instructions stored on a memory therein, and handling numerous interaction requests from the remote sub-systems 104. The computing sub-system 102 may also represent a cluster of computer systems collectively performing estimation and measuring processes as described in greater detail herein. The remote sub-systems 104 can also comprise of desktop, laptop, general-purpose computer devices, and/or networked devices with processing circuits and input/output interfaces, such as a keyboard and display device.

The computing sub-system 102 and/or the remote sub-systems 104 are configured to provide a process, where a processor may receive computer readable program instructions from a usage and loads based maintenance logic (as described below) of the memory and execute these instructions, thereby performing one or more processes defined by the usage and loads based maintenance logic. The processor may include any processing hardware, software, or combination of hardware and software utilized by the computing sub-system 102 and/or the remote sub-systems 104 that carries out the computer readable program instructions by performing arithmetical, logical, and/or input/output operations. For example, the computer readable program instruction may include load spectrum assessment and refinement software for design, testing, and certification of any aircraft system that has fatigue sensitive or life-limited components (e.g., drivetrain components of a rotorcraft).

The memory may include a tangible device that retains and stores computer readable program instructions, as provided by the usage and loads based maintenance logic, for use by the processor of the computing sub-system 102 and/or the remote sub-systems 104. The computing sub-system 102 and/or the remote sub-systems 104 can include various computer hardware and software technology, such as one or more processing units or circuits, volatile and non-volatile memory including removable media, power supplies, network interfaces, support circuitry, operating systems, user interfaces, and the like. Remote users can initiate various tasks locally on the remote sub-systems 104, such as requesting data from the ground-based system 102 via secure clients 110.

The network 106 may be any type of communications network, including a local area network (LAN) or a wide area network (WAN), or the connection may be made to an external computer (for example, through the Internet using an Internet Service Provider). For example, a network may be the Internet, a local area network, a wide area network, satellite network, and/or a wireless network, comprise copper transmission cables, optical transmission fibers, wireless transmission, routers, firewalls, switches, gateway computers and/or edge servers, and utilize a plurality of communication technologies, such as radio technologies, satellite technologies, cellular technologies, etc.

The maintenance database 108 may include a database, data repository, or other data store and may include various kinds of mechanisms for storing, accessing, and retrieving various kinds of data, including a hierarchical database, a set of files in a file system, an application database in a proprietary format, a relational database management system (RDBMS), etc. The data 109 of the maintenance database 108 can include empirical models, estimated data, estimated featured, sensed data, damage metrics, maintenance schedules, maintenance policies, etc. For example, the data 109 can include over 500,000 flight hours of archived historical fleet data for a rotorcraft, and estimated tail rotor torque (TRQ) loads to support assessment and refinement of the load spectrum for design, testing, and certification of drivetrain components.

The computing sub-system 102 and/or the remote sub-systems 104 are also configured to communicate with an aircraft fleet 112 via communication links 114. The aircraft fleet 112 can include a variety of aircraft 116, such as fixed-wing and rotorcrafts. The communication links 114 can be wireless communication links. The communication links 114 may also support wired and/or optical communication when the aircraft 116 are on the ground and within physical proximity to the computing sub-system 102. In exemplary embodiments, the computing sub-system 102 and other components of the ULBM system 100 may be integral to the aircraft 116, such that the ULBM system 100 reliably and automatically measures sensor data to estimate structural loads and apply the estimated structural loads, while compensating for the normal variation in loads. Further, in exemplary embodiments, the aircraft fleet 112 transmits flight data to the computing sub-system 102 for load spectrum assessment and refinement, structural fault detection, etc.

In the example depicted in FIG. 1, each aircraft 116 is a rotorcraft with a main rotor 118 capable of revolving at a sufficient velocity to sustain flight. Aircraft 116 also includes a monitoring sub-system 120 configured to receive sensor data, such as a combination of low-frequency state parametric data and high frequency state parametric data, from sensors 122, 124 (e.g., low-frequency sensors and high-frequency sensors).

The monitoring sub-system 120, the sensors 122, and sensors 124 are communicatively coupled and may be incorporated with or external to each other. During rotorcraft operation, the sensor data is acquired by the monitoring sub-system 120 from the sensors 122, 124 and supplied to other elements of the ULBM system 100. Also, during testing of the monitoring sub-system 120, measured state parameters and measured loads of a test aircraft (e.g., gross weight, center of gravity, strains on the trunnion, and/or monitoring movement of the piston relative to other components of the landing gear assembly, such as the cylinder) are acquired by the ULBM system 100 and/or data acquisition system used for test purposes. Note that loads may be generally measured on the test aircraft and are typically recorded by a test aircraft data acquisition system. The loads may or may not be recorded by HUMS but are combined with parametric data recorded by HUMS through post processing to develop load estimation models. In some cases, loads may be measured on a production aircraft via a key strategic sensor used as additional input into a loads estimation model or directly for loads monitoring.

The sensor 122, 124 are converters that measure physical quantities and convert these physical quantities into a signal (e.g., sensor data) that is read by the monitoring sub-system 120, and in turn the ULBM system 100. In one embodiment, the sensor 122, 124 are strain gauges that measure the physical stress applied to a component of the aircraft 116 (e.g., a landing gear assembly, etc.). Examples of strain gauges include fiber optic gauges, foil gauges, capacitive gauges, etc. In another embodiment, the sensor 122, 124 are temperature sensors that measure the temperature characteristics and/or the physical change in temperature of an aircraft frame. Examples of temperature sensor include fiber optic nano temperature sensor, heat meter, infrared thermometer, liquid crystal thermometer, resistance thermometer, temperature strip, thermistor, thermocouple, and the like. In any of the embodiments, the sensor 122, 124 may be located within a housing to provide protection for the sensor 122, 124 from materials that may cause structural damage to the sensor 122, 124 (e.g., or that may occlude the optically capabilities of the sensor 122, 124).

Furthermore, the sensor 122, 124 are representative of a plurality of sensors monitoring different location and portions of each aircraft 116 with respect to different loads (e.g., a first sensor 122 may be located on a main rotor shaft to detect a main rotor torque, a second sensor 122 may be located on a main rotor hub to detect bending with respect to the main rotor shaft, a third sensor 122 may be located on a bearing to detect loads on that bearing, etc.). Irrespective of the precise location, the sensors 122, 124 can also be positioned in different orientations so that different directional forces may be detected.

In addition to the above, the computing sub-system 102 includes a load estimation and monitoring application 126 ("application 126") comprising computer readable program instructions configured to perform load spectrum assessment and refinement for design, testing, and certification of any aircraft system that has fatigue sensitive or life-limited components (e.g., drivetrain components of a rotorcraft). Further, the application 126 can perform virtual monitoring of loads models, enhanced regime recognition models, and gross weight estimation models, center-of-gravity estimation models, any advanced usage or load estimation and/or monitoring model or process, regime spectrum and/or load spectrum assessment, along with processing the sensor data, in accordance with user inputs instructing the application 126 to operate in a particular manner. For example, the application 126 can perform the operations of acquiring flight data of the rotorcraft (e.g., aircraft 116), transfer of the flight data from the rotorcraft to the database 108, managing the database 108, and using the data to estimate loads by the rotorcraft, calculate fleet 112 statistics, and update design load spectrums from the fleet data. The application 126 ("application 126") is therefore capable of computing and analyzing data 109 as stored on the maintenance database 108 and/or sensor data as detected and outputted by the monitoring sub-system 120 and the sensors 122, 124 on each aircraft 116.

While the application 126 (and other items by each FIG) is illustrated as a single item, these representations are not intended to be limiting and thus, the application 126 items may represent a plurality of applications. For example, multiple applications in different locations may be utilized to access the collected information, and in turn those same applications may be used for on-demand data retrieval. In addition, although one breakdown of the application 126 is offered, it should be understood that the same operability may be provided using fewer, greater, or differently named modules.

In view of the above, the ULBM system 100 and elements therein of the FIG. 1 (and other FIGs) may take many different forms and include multiple and/or alternate components and facilities. That is, while the aircraft 116 is shown in FIG. 1, the components illustrated in FIG. 1 and other FIGS. are not intended to be limiting. Indeed, additional or alternative components and/or implementations may be used. For instance, the monitoring sub-system 120 and the sensors 122, 124 may include and/or employ any number and combination of sensors, computing devices, and networks utilizing various communication technologies, as described below, that enable the ULBM system 100 to perform the load estimation, load measuring, usage spectrum assessment, load spectrum assessment, retirement time calculation processes, maintenance calculation processes, and any combination thereof, as further described with respect to FIGS. 2-4.

Figure 2:
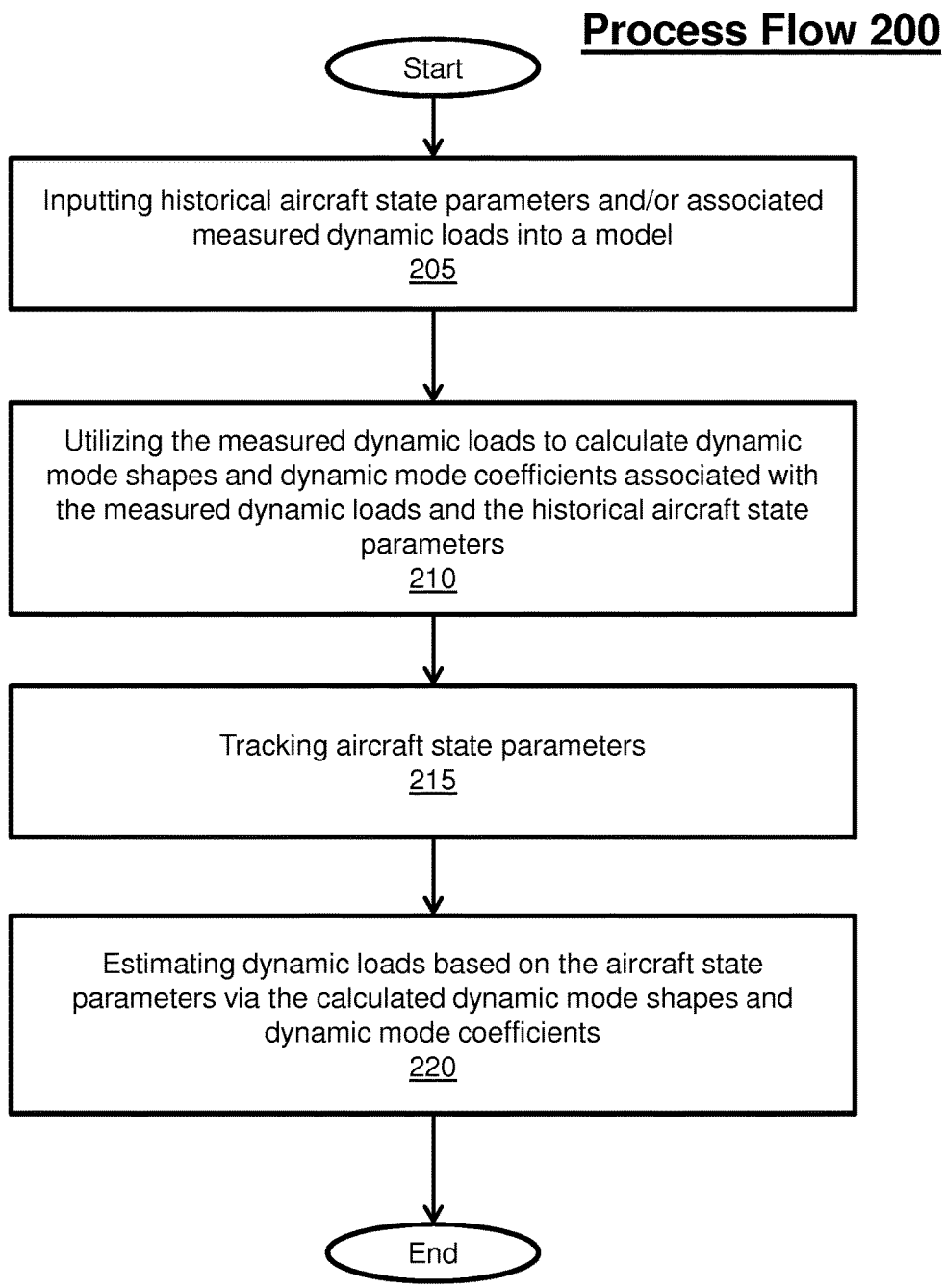
FIG. 2 illustrates a process flow for developing models for load estimation and for an application of load estimation by a usage and loads based maintenance system.

Turning now to FIG. 2, a simplified process flow 200 of a ULBM system 100 for load model training and model application is illustrated. To perform a model training, the process flow 200 begins in block 205, where the ULBM system 100 (e.g., the application 126) inputs historical aircraft state parameters and/or associated measured dynamic loads into a model. This is a model building or training operation, where the data 109 is cleaned and scrubbed. At block 210, the ULBM system 100 utilizes the measured dynamic loads to calculate dynamic mode shapes and dynamic mode coefficients associated with the measured dynamic loads and the measured aircraft state parameters.

Next, to perform a model application, the process flow continues in block 215, where the ULBM system 100 tracks aircraft state parameters. At block 220, the ULBM system 100 estimates dynamic loads based on the aircraft state parameters via the calculated dynamic mode shapes and parameter-depending dynamic mode coefficients.

Figure 3:
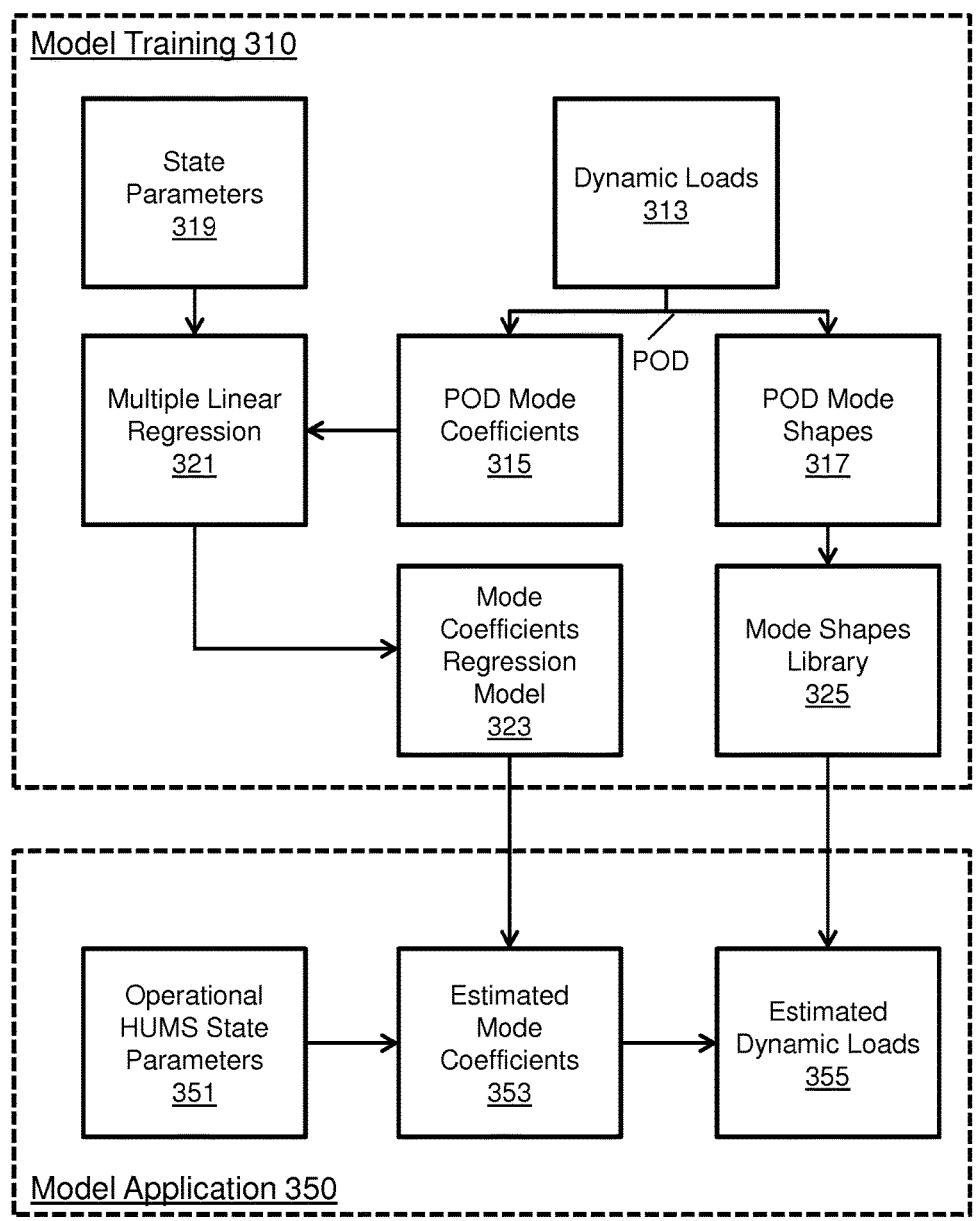
FIG. 3 illustrates another process flow for developing load estimation models and for the application of load estimation by a usage and loads based maintenance system.

Turning now to FIG. 3, a process flow 300 within the application 126 of the ULBM system 100 is illustrated, which may be viewed as an expansion on the load model training and estimating process 200 of FIG. 2. The process flow 300 includes a process for developing models for load estimation and a process for the actual load estimation. For instance, the process flow 300 relates to a virtual monitoring of loads model ("model") executed by the application 126, where the model estimates high-frequency rotorcraft dynamic load profiles from once per revolution average rotorcraft state parameters.

The process flow 300 begins with model training 310, which in general is derived using measured dynamic loads and associated rotorcraft state parameters from structural flight load survey testing. During model training 310, important dynamic load waveform mode shapes are extracted from the measured load using partial orthogonal decomposition (also known as principal components analysis or singular value decomposition). For instance, dynamic loads (block 313) of a vehicle are utilized to derive mode coefficients (block 315) and mode shapes (block 317). Then, the vehicle state parameters (block 319) are mapped to the mean load and mode shape coefficients via linear regression models (block 321). The result of model training is a library of parameter-dependent mode coefficients (block 323) and fixed mode shapes (block 325) that can be used in model application 350.

To apply the load estimation models (model application 350), dynamic load waveform, steady load, and/or vibratory amplitude are calculated from parametric data, in real time or in a post processing environment. Operational HUMS state parameters (block 351) recorded from a vehicle are utilized to calculate the parameter-dependent mode coefficients (block 353). The mode coefficients are them applied to the mode shapes to estimate dynamic loads (block 355). For example, to apply virtual monitoring of loads to a rotorcraft, the mode coefficients are estimated from operational HUMS recorded rotorcraft state parameters, and the resulting mode coefficients are used to estimate component load waveforms and/or other component load features (e.g., mean, vibratory amplitude).

Figure 4:
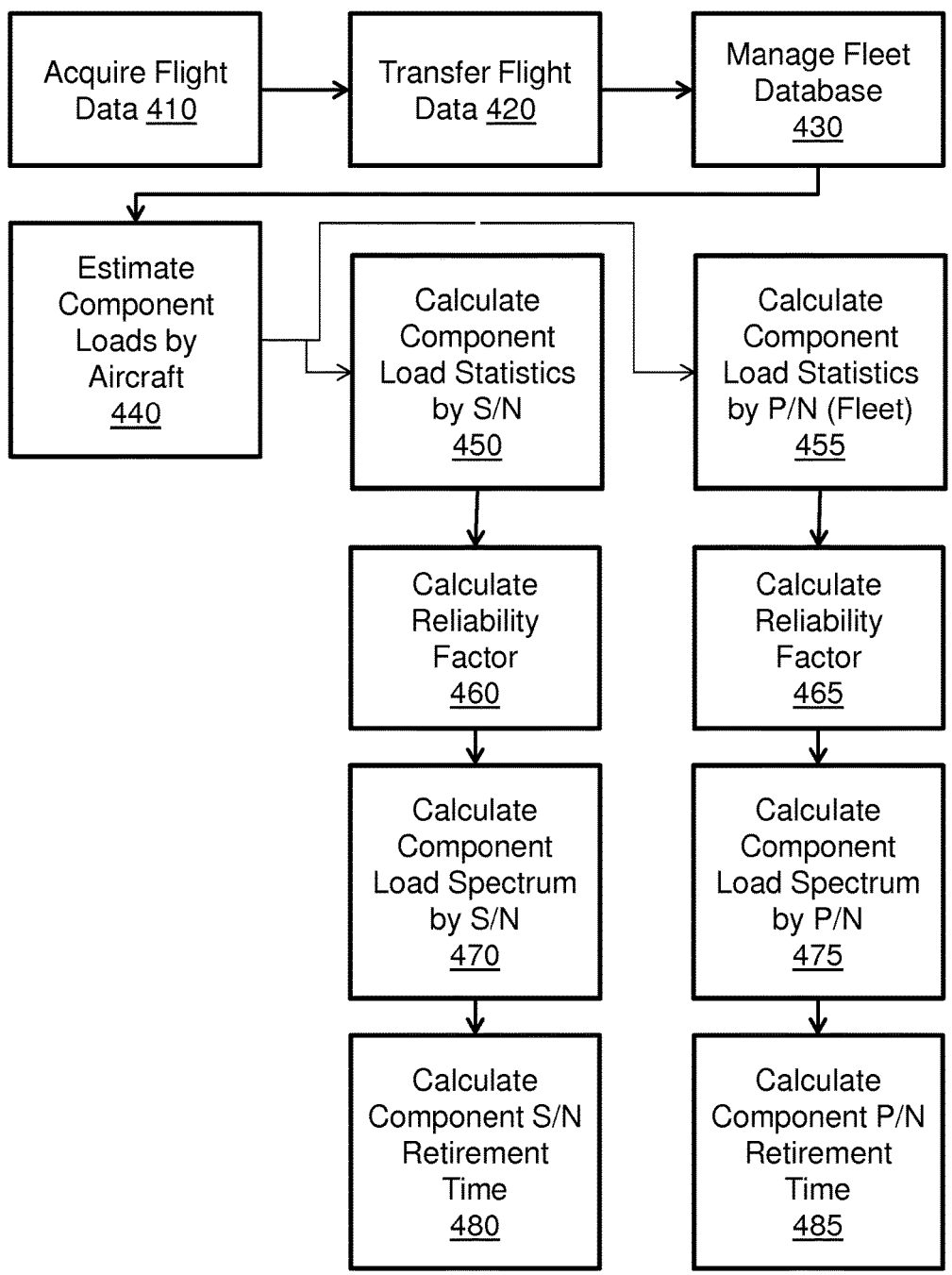
FIG. 4 illustrates an application of a virtual load monitoring by a usage and loads based maintenance system.

Turning now to FIG. 4, a process flow 400 of a ULBM system 100 is illustrated for using usage and load estimation or measurements to calculate component retirement times and/or other maintenance calculations based on actual aircraft and fleet usage and loads. The process flow begins in block 410, where the ULBM system 100 can perform the operations of acquiring flight data of the aircraft 116 (e.g., flight parameters are sensed and recorded). For instance, the ULBM system 100 acquires flight parameter data from aircraft sensors, such as all of the parametric data from a rotorcraft operation. Said flight parameter data, also known as parametric data, aircraft state parameters or aircraft operating states, may include aircraft operating states (e.g., forward flight speed, aircraft attitude, altitude), component loads, or derived parameters (e.g., regimes, aircraft gross weight, aircraft center of gravity) calculated from other aircraft state parameters. Then, the data is saved or recorded to a disk, such as a memory installed in on-board HUMS equipment. In this way, embodiments of ULBM system 100 may be implemented as an onboard real time application that utilizes load models for advanced load limiting flight control or in structural load monitoring where key structural limitations (e.g., parametric data) can be monitored locally in-real time. At block 420, the ULBM system 100 transfers parametric data to a ground computer and/or into a central fleet usage database.

At block 430, the ULBM system 100 manages the database by organizing and assessing data quality to isolate corrupt or invalid data and identify missing data. Within this database, historical records of parametric data that pertain to a specific categorical population, such as an aircraft tail number, operator, mission, component serial number, or component part number are identified such that they can be extracted at any point in the lifecycle of the fleet. In this way, embodiments of ULBM system 100 may perform a collecting and sorting of flight parameters across a fleet 112, perform quality assessment of those flight parameters, and extract valid flight parameters for any aircraft 116. Further, derived parameters such as regime, gross weight or center of gravity may be calculated and inserted into the database if not calculated on board the aircraft. At block 440, the ULBM system 100 calculates estimated component loads from aircraft parametric data, including application of correction factor(s) to account for estimation model uncertainty. The calculation of estimated component loads may be performed according to the process flow 350 of FIG. 3. The resultant estimated loads are stored in the fleet database (not shown in the process flow 400) for subsequent use. Note that data issues may be flagged for evaluation and mitigation by a database administrator or subject matter expert at any point along the process flow 400.

Next, the ULBM system 100 calculates the fleet statistics and updates design load spectrums from the fleet data. In general, to calculate fleet statistics, the ULBM system 100 performs data quality assessment of the estimated loads, calculates load spectrums for any aircraft 116, calculates a fleet worst case load spectrum, and/or calculates reliability margins. To update design load spectrums from the fleet data, the ULBM system 100 applies the reliability margins to the fleet worst case spectrum, compares the resulting fleet based spectrum to an existing design load spectrum, and adjusts a design load spectrum to align with the fleet based spectrum. In one embodiment, as shown in FIG. 4, the process flow 400 may separately process the estimated loads with respect to component serial numbers (S/Ns) and component part numbers (P/N); however, this embodiment is not intended to be limiting. In fact, it is noted that different combinations and process flows may be implemented beyond what is illustrated by the process flow 400. A component serial numbers (S/Ns) is alphanumeric identification associated with a specific instance of a component or part number. A component part numbers (P/N) alphanumeric identification associated with a type of component.

At block 450, the ULBM system 100 statistically analyzes the resultant estimated component loads, assesses data quality to isolate and remove anomalous data that were not isolated by the central fleet usage database and organizes data according to component serial number (S/N), regardless of installation of said S/N on one or more aircraft. The resultant load statistics for each serial number are stored in the fleet database (not shown in process flow 440) for use by subsequent process blocks. Again, data issues may be flagged for evaluation and mitigation by a database administrator or subject matter expert.

At block 455, the ULBM system organizes data according to component part number (P/N) and calculates component load statistics for each part number. The resultant load statistic for a part number are stored in the fleet database (not shown in process flow 440) for use by subsequent process blocks. Again, data issues may be flagged for evaluation and mitigation by a database administrator or subject matter expert.

At block 460, the ULBM system 100 calculates a reliability factor based on the component load statistics for each specific serial number. At block 465, the ULBM system calculates a reliability factor for the population and sub-populations (e.g., operator's fleet, aircraft mission type) of all component serial numbers for each component part number. The resultant reliability factors for each serial number and part number population are stored in the fleet database (not shown in process flow 440) for use by subsequent process blocks. Again, data issues may be flagged for evaluation and mitigation by a database administrator or subject matter expert.

At block 470, the ULBM system 100 calculates the component load spectrum for each serial number by augmenting the statistical load population to backfill for corrupt, suspicious or missing data; applying the reliability factors for said serial number to achieve desired reliability; calculating the distribution of loads over time or cycles from the estimated dynamic load history for the component serial number. The augmentation to account for bad data can be done in several different conservative ways to ensure safety and reliability, including the use of conservative estimates of loads during periods of bad data based on assumed component design load spectra or specified (e.g., $95^{th}$) percentile loads based on estimated component load statistics calculated for the serial number on block 450. The resultant component load spectrum for each serial number is stored in the fleet database (not shown in process flow 440) for use by subsequent process blocks. Again, data issues may be flagged for evaluation and mitigation by a database administrator or subject matter expert.

At block 475, the ULBM system 100 calculates the component load spectrum for all serial numbers for a given part number and target sub-populations (e.g., an operator's fleet, all aircraft flying certain missions types) by calculating a fleet composite worst case load spectrum from all the individual component serial number load spectra and applying the part number reliability factors calculated in block 465 to achieve desired reliability. The resultant load spectrum for each serial number are stored in the fleet database (not shown in process flow 440) for use by subsequent process blocks. The resultant component load spectrums for each part number population are stored in the fleet database (not shown in process flow 440) for use by subsequent process blocks. Again, data issues may be flagged for evaluation and mitigation by a database administrator or subject matter expert.

At block 480, the ULBM system 100 calculates the component retirement time for each serial number by calculating accumulated fatigue damage based on the load spectrum to date and estimating remaining useful life. Fatigue damage accumulation rates assumed for calculating remaining useful life can be based on various different approaches such as applying design load spectra for remaining life or conservative assumptions based on the historical load spectrum. The component retirement time can be continuously updated until such time that the part must be actually retired. Alternatively, a one-time retirement time credit can be calculated near the end of useful life of a specific component serial number, using standard conservative flight-hour based approaches to determine the point when the one-time credit should be calculated. Of course, other methods of tracking retirement time using the same basic approach are possible. The resultant component retirement time or retirement time trend for each serial number is stored in the fleet database (not shown in process flow 440). Again, data issues may be flagged for evaluation and mitigation by a database administrator or subject matter expert.

At block 485, the component retirement time for a specific part number can be calculated for target populations (e.g., all serial numbers, operator's fleet, aircraft flying specific missions) by calculating accumulated fatigue damage based on the target population load spectrum, the damage accumulation rate per flight hour for the target population, and the retirement time in flight hours for the target population when useful fatigue life has been expended. The resultant component retirement time for each part number population is stored in the fleet database (not shown in process flow 440). Again, data issues may be flagged for evaluation and mitigation by a database administrator or subject matter expert.

The final or intermediate results from the ULBM system 100 can be extracted by an end user at any time. Abnormal results are flagged for evaluation and mitigation by a database administrator or subject matter expert. One embodiment of the ULBM system 100 and associated processes is a fully automated system that presented results in the form of periodic report(s), which could be daily, weekly, monthly, quarterly or any period that is appropriate for a given fleet of aircraft. It is expected that early steps in process flow 400 hundred would have frequent reporting so that data issues can be resolved quickly rather than mitigated at the end of the process resulting in less benefit. Alternatively, the ULBM system 100 could be more driven through user interaction requesting calculated retirement times for a specific serial number, part number or component population. While the process descriptions are based on the use of a ULBM system 100 to calculate component retirement times, the ULBM system 100 and associated processes would work equally well with loads measured by physical sensors or adjustments in calculated component retirement times based on regime recognition, gross-weight measurement/estimation, center-of-gravity measurement/estimation and/or other advanced usage or loads monitoring methods.

In view of the above description, an example of one embodiment application of virtual monitoring of loads for a maintenance benefit by a ULBM system 100 will now be described. In general, a creation of a TRQ virtual monitoring of loads model involved the selection of appropriate input signals that can be used for prediction of the mode shape coefficients, and selection of applicable flight test data for training and validation of the model. The selected parameter set and flight data is input to a virtual monitoring of loads model building software application that automatically segregates training and validation data, performs the model regression analysis, and presents validation results.

Preliminary evaluation of input parameters can be accomplished using data recorded from a flight test data acquisition unit, as opposed to operational HUMS parametric data, which are often acquired at different rates, with different engineering units, and different sensors than typically used for flight testing. Input parameters were selected to provide relevant system state data without providing redundant or correlated parameters. Selection of inputs was constrained to what is available in operational HUMS data, which spans a wide range including atmospheric data, engine parameters, vehicle dynamics, and pilot inputs. It was also desired to select inputs that were fully exercised and evaluated in the training/validation flight test data. This last criterion ultimately led to the removal of outside air temperature from the model, since the available flight test data did not span the full expected range from the fleet. However the training set did explore the effect of density altitude, which is considered a far more important atmospheric variable affecting the performance of the vehicle and associated loads. The final parametric set of input data consisted of 14 vehicle state parameters, which are listed in Table 1.

TABLE 1

| TRQ virtual monitoring of loads Input Parameters | |
|---|---|
| Parameter Name | Units |
| Main Rotor Speed | % |
| Pitch Angle | RPM |
| Roll Angle | deg |
| Yaw Rate | deg |
| Cyclic Longitudinal Position | deg/s |
| Cyclic Lateral Position | % |
| Collective Position | % |
| Pedal Position | % |
| Lateral Acceleration | % |
| Vertical Acceleration | $ft/s^2$ g |
| Density Altitude | ft |
| Cal Airspeed | kts |
| Altitude Rate | ft/min |
| Average Engine Torque | ft-lbs |

Next, a selection of flight test data was performed. The selection of flight test data for model development required that the test aircraft was instrumented with a calibrated tail rotor torque sensor, the test configuration was representative of current fleet operations, and the test card included structural flight load survey maneuvers. Additionally, to validate the model when operating with HUMS parametric data, the test aircraft must have had a HUMS system installed during the test. Because the flight test data was divided into training and validation sets, this latter requirement was only applied to the validation data set. Validation of model performance on data recorded directly by the HUMS system was executed, along with a validation of the entire workflow of extracting HUMS parametric data from the archived database, transferring the data to the modeling environment, calculating the virtual monitoring of loads loads, and extracting virtual monitoring of loads load statistics. In this example, over 3,500 flight test maneuver records (runs) were included in the training and validation data set.

Then, validation of the model was performed. Validation provides information about model performance on a blind set of test data. There are several methods to evaluate model performance, and the most appropriate validation method can be dependent on how the model results can be used. For example, models can be evaluated to compare the predicted vs. measured load in terms of 1) load waveform on a sample basis, 2) peak load on an flight test run basis, and 3) cumulative distribution of load for a large set of flight data. The waveform approach evaluates real time model error relative to a measured load on a sample by sample basis. If the model prediction lags the real time measurement by a small amount, an error can be recognized due to the time lag regardless of whether the model correctly predicted the load magnitude after some small time delay. On the other hand, the peak load approach evaluates the peak predicted load of the model relative to the peak measured load across a flight test run.

Further, evaluation of the model's ability to predict the correct load distribution over a large set of data is a more direct assessment of how errors accumulate or cancel when processing large amounts of virtual monitoring of loads torque data into load histogram or power spectrum. An error distribution symmetrically centered on zero can yield much better predictions of the load distribution over large data sets compared to a model with a small load bias, which can tend toward over or under prediction of percent time above a given load threshold. By evaluating both the peak load error distribution and cumulative load distribution at the high torque levels where model performance is most critical, small error corrections were developed for the virtual monitoring of loads model and applied during post processing.

To develop fleet wide load statistics, it was desirable to analyze as much fleet data as possible, representing all operators and mission types that were represented the archived database. Prior to applying the model to archived fleet data, a process was established to classify the aircraft state (on ground, powered flight, autorotation), and assess whether the operational data resided within the model domain (interpolation versus extrapolation). Calculation of virtual monitoring of loads loads against 500,000 hours of fleet data was performed in a distributed fashion across multiple sites to reduce overall processing time. While the estimated tail rotor torque time history data was computed for every archived flight, the complex torque histories had to be reduced into histograms that could be summed across all flights for a given tail number, or rolled up to an operator's fleet or mission category.

Calculating virtual monitoring of loads on 500,000 flight hours is computationally burdensome, taking roughly a calendar week for a full pass through the database. In addition to the 500,000 flight hours, the archived HUMS database includes a significant amount of ground time that must be filtered to avoid needless processing. To streamline processing, the aircraft state space was broadly categorized into four regions that are important for deciding when to calculate virtual monitoring of loads loads. First, a powered flight state was identified using a combination of weight-on-wheels and engine torque parameters. Virtual monitoring of loads loads were only calculated when the aircraft was in a normal powered flight state. Persistence logic was developed to ensure a single state transition during takeoff and landing. Second, autorotation was classified because the virtual monitoring of loads model was not validated for autorotation periods and therefor was not interrogated during these periods. Third, ground time was classified so that the virtual monitoring of loads model would not interrogated when an aircraft was on the ground. Finally, a fourth state was classified to remove time periods when any of the necessary input parameters were not present in the parametric data. The last three states were all dealt with in the same way, by not computing virtual monitoring of loads loads; however, it was desired to define them separately such that they could be distinguished and tracked. Tracking flight hours within each category provided valuable data for comparison of calculated flight hours versus operator logged flight hours, and for troubleshooting when some tail numbers had fewer calculated flight hours than expected. Tracking total calculated flight hours for which virtual monitoring of loads loads are calculated (as opposed to using operator logged flight hours) was also critical in accurately converting virtual monitoring of loads load spectrum data from a flight-hour basis to a percent time basis.

Model domain is the multidimensional space of input data where the model was trained and validated. The model is considered to be interpolating when a set of input data falls within the training domain, and extrapolating when it does not. Two options for the shape of the model domain were considered: a hyper-rectangle and a hyper-ellipse. The hyper-rectangle is more simply described as a range check on every input parameter relative to the training set. It is also simpler to define and implement, although it is a less-strict test or interpolation. The hyper-rectangle method was found to be very useful in both identifying extreme conditions and in isolating corrupt results due to failed sensors. Extreme conditions can be described where a single parameter exceeds the maximum value from the training set for a brief transient period, such as in the case of an extreme engine torque exceedance. In this scenario, the virtual monitoring of loads model would be extrapolating for a few seconds at most during the event. FIG. 6 shows an example of an extreme engine torque event from the fleet that exceeded the maximum engine torque from flight test training. During this event, the tail rotor virtual monitoring of loads model is extrapolating for three seconds which is indicated by the model status flag. Virtual monitoring of loads model performance during the out-of-domain periods was observed to be very well behaved so long as the parameter exceedance was real (not result of failed sensor) and the exceedances were only a few percent of the exceeded parameter range. Because a structural flight test program aims to push the envelope of the aircraft beyond that specified in the operational flight manual, these types of exceedances were both small and rare.

On the other hand, many cases were found where failed sensors produced extended periods of extrapolation, such as when a sensor fails during a flight and is not repaired until either the end of the flight or several flights later for non-flight critical sensors. The model domain tracking approach thus enabled identification of these abnormal regions during post processing and removal from the results set.

Both aircraft state and model domain state were evaluated and stored in the model status flag parameter for every sample of data. This status flag enabled isolation of questionable in-flight extrapolated results from high quality interpolated results. Combined with strict persistence logic during takeoff and landing transitions, the status flag was also used to identify contiguous in-flight time periods for ground-air-ground load capture. The status flag also enabled identification of data to be evaluated by engineering subject matter experts as appropriate for deeper dive assessment.

To facilitate the post processing of model results, estimated torque time histories from each flight were reduced into a multidimensional histogram that tracked total time count within predefined torque bins and model domain, and collected relevant metadata such as tail number, flight date, and flight time. This data structure was designed to allow the combination of results from multiple batch runs and processing sites while retaining the ability to segregate data by individual tail number, time period, and model status, and allow for the piecewise engineer-in-the-loop removal of corrupt results attributed to a particular tail number and date range.

In addition to the torque histograms, maximum values of estimated tail rotor torque were stored on a per flight basis along with maximum values of relevant input parameters such as engine torque and airspeed. Storing key model input parameter statistics along with virtual monitoring of loads model statistics was critical to enabling rapid checking of the veracity of the highest torque values from the fleet, which often occurred during extremely high engine torque events combined with high yaw rates. Every extreme tail rotor torque load event of interest in the fleet was not only cataloged for load spectrum analysis, but was made available for further investigation to gain insight into real fleet events that cause the most extreme torque loads. Once results from all batches and processing sites were combined, the final data extraction product was a multidimensional torque load histogram from initialization back to inception of the fleet that can be grouped and segregated by tail number, operator, mission type, time period, and model domain. Next, an analysis of the results was performed.

Before evaluating individual tail number torque load spectrums across the fleet, quality checks were performed to eliminate corrupt data. Use of the model status parameter to identify out of domain data was critical to ensuring data quality. Out of domain results were found to fall in three categories: 1) a single sample invalid sensor input which causes a spike in virtual monitoring of loads output; 2) a totally failed sensor which remained failed for an entire flight, and 3) a slight exceedance of flight test min-max values for input state parameters. While the first and second categories could be removed as corrupt data, it was deemed critical to capture the third category events into the results. Simple logic was developed to automatically identify the category 1 and 2 data and flag for filtering as a post processing data quality check. The total amount of corrupt data flagged and removed from the results set was approximately 8,000 flight hours, or roughly 2% of the total processed set of flight hours. The remainder of out of domain data, which represented the third category, was retained in the general results population and was readily identifiable for engineer-in-the-loop investigation.

Individual tail number torque histograms were then reviewed to understand the basic fleet power distribution shapes. It was found that some extremely low time aircraft (<50 hours) spent a lot of time at moderate power conditions such as hover and low speed flight, mostly likely during initial pilot training. Not having a sufficiently long history to be meaningful, these low time aircraft were removed from the general results population for this application.

After removing corrupt data and very low time aircraft, individual tail number torque histograms were converted to a horsepower spectrum and summed into larger groupings of operator, mission type, and entire fleet, which revealed unique characteristics of the groupings. While these combined spectra provide insight into variability across operator and mission type, combining tail number power spectrums into groups has an averaging effect of diluting the critical features that may be attributed to only a select few tail numbers. It is precisely these critical few tail numbers that must be considered in the design process and represented in a design spectrum.

To overcome this, a process was developed to capture the most critical features of the entire fleet into a single spectrum. First, each tail number power spectrum was converted from a flight hour basis to percent time basis. This ensured that a 5,000 hour aircraft has just as much an influence on the result as a 10,000 hour aircraft. Second, tail number power spectrums were converted from a density plot to a reversed cumulative distribution function (CDF) plot, or a "1-CDF" plot. In this plot, the highest power levels are represented with the lowest % time. Lastly, the highest cumulative percent time within each predefined power bin across all tail numbers was copied into a new composite cumulative spectrum. This last step produces a composite worst case cumulative power distribution from the fleet, which can then be converted back into a composite worst case power spectrum density plot.

For example, two aircraft are known to have unique power spectrums. Aircraft A spends more time in the mid-range power levels, while Aircraft B spends more time at higher power levels. The resulting composite power spectrum maintains these critical features of both Aircraft A and Aircraft B, while ignoring the time at low power for Aircraft B. These low power bins are not represented in the composite spectrum because the composite spectrum is limited to 100% time, and that time as already been filled into the high power bins. This type of composite worst case fleet spectrum enables a direct comparison against the design load spectrum, which is typically developed from a composite worst case usage spectrum, rather than from any individual aircraft or mission usage spectrum.

Next, a torque ground-air-ground (GAG) analysis was performed. Torque GAG load is defined as the single ground-air-ground load cycle incurred as a function of takeoff and landing cycles. In quantifying GAG loads, both the number of cycles and the peak load for each cycle are required. Because maximum torque values per flight were retained during data reduction, a torque GAG load spectrum was easily created for each tail number and then combined into a composite worst case using the same procedure defined previously.

Next, spot checking was performed. Because maximum values per tail number flight were retained along with timestamps during data reduction, the highest torque events from the fleet could be investigated further by going back into the archived datasets to find the most significant events of interest. This enabled a deeper understanding of the types of flight conditions that cause the highest tail rotor torque loads in the fleet than was available from a set of flight test data. Spot checking was performed on the top ten highest torque events for three critical tail numbers. Each scenario was reviewed carefully with the full set of vehicle state parameters and regime data. Many of the highest torque events from the fleet were found to be consistent with the regimes that create the highest torque from flight test. However, some of the most extreme flight test maneuvers from a tail rotor torque perspective were not found in any of the high torque events that were spot checked. That is not to say that the most extreme flight test maneuvers never occur in the fleet, but rather, they rarely occur as expected and the high torque maneuvers performed most frequently in the fleet can more likely be responsible for the overall peak loads due to the high number of occurrences.

With the above results of the virtual monitoring of loads study generated, these results can be applied in a number of ways for different applications related to the drive train. For the application highlighted as an example herein, the fleet worst case tail rotor power spectrum was compared directly against the tail rotor power design spectrum to identify regions that could benefit from usage prorating.

For example, consider the case where a damaging fatigue threshold is defined for gear train components as a Maximum Continuous Power (MCP) torque level. The total cumulative percent time above this damaging threshold can be calculated for every tail number in the fleet and compared to the design load spectrum assumption. The variation of the MCP exceedance metric in the fleet can be modeled by a distribution. While the virtual monitoring of loads results do not directly indicate which high load regimes are, or are not, being flown to assumed levels by the fleet, the results do indicate where the load spectrum is over conservative and highlight areas where a fleet-based usage prorate can be implemented for targeted regimes.

In applying the UMRF method, the cumulative percent time statistic at critical load levels was modeled as a distribution, and the ratio of the 90th percentile to the 50th percentile was calculated as the reliability factor.

This reliability factor was defined for several load levels, and applied to the worst case tail number usage statistic at each load level. This method provided a reliability based margin that can be applied against the fleet worst case load spectrum, and then used to develop usage prorates for targeted regimes where the design load spectrum was overly conservative.

Using this method, several usage spectrum prorates were developed for critical high load regimes that reduced the assumed time spent in those conditions. After applying the UMRF factor, usage prorate reductions for these regimes ranged from 60% to 90% relative to the original spectrum. These usage prorates were adopted into the tail rotor design load spectrum and applied to a life limited high cycle fatigue gear train component. The new fleet based usage prorates had the effect of increasing the critical component retirement time by a factor of 2.5.

While the example highlighted here focuses on developing usage prorates for a tail rotor power spectrum, the same process was demonstrated and applied for the tail rotor torque GAG load spectrum. Similar life benefits were achieved on a GAG critical transmission component. While these prorates have been adopted and evaluated for a few critical components, the design life implications across the drive train are yet to be investigated. However early indications are that at least a doubling of the design life for critical components could be possible from a ULBM system.

In view of the above, the systems, sub-systems, and/or computing devices, such as ULBM system, may employ any of a number of computer operating systems. Examples of computing devices include, without limitation, a computer workstation, a server, a desktop, a notebook, a laptop, a network device, a handheld computer, or some other computing system and/or device.

Computing devices may include a processor and a computer readable storage medium, where the processor receives computer readable program instructions, e.g., from the computer readable storage medium, and executes these instructions, thereby performing one or more processes, including one or more of the processes described herein (e.g., estimation and measuring processes).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication).

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the ULBM system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of ULBM system and method.

In view of the above, embodiments may include a method for an application of a virtual load monitoring of an aircraft, comprising: estimating component loads from aircraft state parameters; applying correction factor to estimated component loads to account for estimation model uncertainty; calculating fleet component load statistics from corrected estimated component loads; calculating a reliability factor; generating a component design load spectrum from the fleet statistics by applying the reliability factor to derive a fleet worst case component load spectrum; and applying the component design load spectrum to determine the component retirement time.

According to another embodiment or in combination with the method embodiment above, said estimating components loads may be generated by: inputting historical aircraft state parameters and associated measured dynamic loads into a model; utilizing the measured dynamic loads to calculate dynamic mode shapes and dynamic mode coefficients associated with the measured dynamic loads and the historical aircraft state parameters; tracking aircraft state parameters; and estimating dynamic loads based on the aircraft state parameters via the calculated dynamic mode shapes and dynamic mode coefficients to produce the estimated loads.

According to another embodiment or in combination with any of the method embodiments above, the assessment of the estimated loads can further comprise statistically analyzing the estimated loads for the plurality of serial numbers for a component; calculating a reliability factor based on the estimated loads for each specific serial number; calculating a component load spectrum for each serial number; calculating accumulated fatigue damage for each serial number; and calculating a retirement time and remaining useful life for each serial number.

According to another embodiment or in combination with any of the method embodiments above, the component design load spectrum can be generated from estimated component load statistics for a plurality of components.

According to another embodiment or in combination with any of the method embodiments above, the generation of component design load spectrum for a plurality of components can further comprise organizing data according to component part number; calculating component load statistics for each part number; calculating a reliability factor based on the of the component load statistics for each specific part number; generating a component design load spectrum for each part number by applying the reliability factor to derive a fleet worst case component load spectrum for each part number; and/or applying the component design load spectrum to determine the component retirement time for each part number.

According to another embodiment or in combination with any of the method embodiments above, the design load spectrum can be compared to the design usage spectrum to derive a new design usage spectrum.

According to another embodiment or in combination with any of the method embodiments above, the component load spectrum can be calculated from measured loads from a physical sensor for at least one component or part number (e.g., all components and/or part numbers).

According to another embodiment or in combination with any of the method embodiments above, the component load spectrum can be calculated from aircraft certification flight load survey data for at least one component or part number (e.g., all components or part numbers).

According to another embodiment or in combination with any of the method embodiments above, said aircraft state parameters can correspond to system operating states.

According to another embodiment or in combination with any of the method embodiments above, said aircraft state parameters can include data from at least one load sensor signal According to another embodiment or in combination with any of the method embodiments above, the calculated load statistics can be partitioned to correspond to one or more regimes where said regimes are defined by ranges of aircraft state parameters.

According to another embodiment or in combination with any of the method embodiments above, the reliability factors can be calculated from load statistics for each regime.

According to another embodiment or in combination with any of the method embodiments above, the component design load spectrum for at least one component can be generated by applying a plurality of reliability factors to derive a fleet worst case component load spectrum corresponding to a plurality of regimes.

According to another embodiment or in combination with any of the method embodiments above, the design load spectrums can be partitioned by regimes are generated for a plurality of components.

According to another embodiment or in combination with any of the method embodiments above, the design load spectrum for each component can be partitioned by regimes further comprises categorizing by regimes generated by regime recognition algorithms.

According to another embodiment or in combination with any of the method embodiments above, the partitioned load spectrum can included partitions corresponding to different aircraft gross weight and/or center of gravity categories.

According to another embodiment or in combination with any of the method embodiments above, the component load spectrum can be calculated from measured loads from a physical sensor for at least one component or part number.

According to another embodiment or in combination with any of the method embodiments above, the component load spectrum can be calculated from aircraft certification flight load survey data for at least one component or part number.

According to another embodiment or in combination with any of the method embodiments above, the assessment of the estimated loads can further comprise a calculation of an inspection interval for each serial number.

Embodiments may also include a system for an application of virtual load monitoring of an aircraft. The system may comprise a processor that performs operations in accordance with any of the method embodiments above.

Technical effects and benefits of embodiments include the first in-depth application of virtual monitoring of loads to affect the design or qualification process, so as to go from predicted virtual monitoring of loads to a substantiated fleet usage based design life (e.g., in the above embodiments, a 3.5× life benefit was achieved by utilizing the value of virtual sensors and of a fleet database of 500,000 flight hours). Further, embodiments described herein can be embedded within onboard HUMS software, enabling even more sophisticated in-depth application of virtual monitoring of loads. Thus, embodiments described herein pave the way for future fleet based credit methods, whether leveraging virtual monitoring of loads or other emerging usage and load monitoring technologies.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

The flowchart and block diagrams in the FIGS. illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the FIGS. For example, two blocks shown in succession may, in fact, be executed substantially concurrently, or the blocks may sometimes be executed in the reverse order, depending upon the operability involved. It can also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the described embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It can be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for an application of a virtual load monitoring of an aircraft to determine a component retirement time for at least one component of the aircraft, comprising:
   estimating component loads from aircraft state parameters by statistically analyzing the component loads for a plurality of serial numbers for the at least one component;
   calculating load statistics from the component loads;
   calculating a reliability factor based on the component loads for each serial number of the plurality of serial numbers;
   generating a component design load spectrum by:
      calculating a component load spectrum for each serial number of the plurality of serial numbers,
      augmenting the load statistics to back fill for corrupt or missing data and,
      applying the reliability factor to the augmented load statistics to identify a desired reliability,
      the component design load spectrum being based on the component load spectrum for each serial number and the desired reliability;
   calculating the component retirement time for the at least one component of the aircraft by utilizing the component design load spectrum by calculating accumulated fatigue damage for each serial number of the plurality of serial numbers and calculating a retirement time and remaining useful life for each serial number of the plurality of serial numbers; and
   retiring the component at the calculated component retirement time.

2. The method of claim 1, wherein the estimating of the component loads further comprises:
   inputting historical aircraft state parameters and associated measured dynamic loads into a model;
   utilizing the measured dynamic loads to calculate dynamic mode shapes and dynamic mode coefficients associated with the measured dynamic loads and the historical aircraft state parameters;
   tracking aircraft state parameters; and
   estimating dynamic loads based on the aircraft state parameters via the calculated dynamic mode shapes and dynamic mode coefficients to produce the components loads.

3. The method of claim 1, wherein the estimating of the component loads further comprises:
   applying correction factor to the component loads to account for estimation model uncertainty to produce corrected estimated component loads, the corrected estimated component loads being utilized as the component loads for calculating the load statistics.

4. The method of claim 1, wherein the load statistics correspond to a plurality of components of the aircraft to produce component load statistics.

5. The method of claim 4, wherein the generating of the component design load spectrum corresponding to the plurality of components further comprises:
   organizing data according to a plurality of component part numbers;
   calculating component load statistics for each part number of the plurality of component part numbers;
   calculating a reliability factor based on the of the component load statistics for each part number of the plurality of component part numbers;
   generating the component design load spectrum for each part number of the plurality of component part numbers by applying the reliability factor to derive a fleet worst case component load spectrum for each part number; and
   applying the component design load spectrum to determine the component retirement time for each part number.

6. The method of claim 1, wherein the component design load spectrum is compared to a design usage spectrum to derive a new design usage spectrum.

7. The method of claim 1, wherein the component design load spectrum is generated from measured loads from a physical sensor for at least one component or part number.

8. The method of claim 1, wherein the load statistics are partitioned to correspond to one or more regimes, wherein the one or more regimes are defined by ranges of the aircraft state parameters.

9. The method of claim 8, wherein the partitioned load statistics include partitions corresponding to different aircraft gross weight or center of gravity categories.

10. The method of claim 1, wherein the reliability factor is calculated from the load statistics for one or more regime.

11. The method of claim 1, wherein the component design load spectrum for the at least one component is generated by applying a plurality of reliability factors to derive a fleet worst case component load spectrum corresponding to a plurality of regimes.

12. A system for an application of a virtual load monitoring of an aircraft to determine a component retirement time for at least one component of the aircraft, the system comprising:

a processor, the processor configured to perform operations comprising:
  estimating component loads from aircraft state parameters by statistically analyzing the component loads for a plurality of serial numbers for the at least one component;
  calculating load statistics from the component loads;
  calculating a reliability factor based on the component loads for each serial number of the plurality of serial numbers;
  generating a component design load spectrum by:
    calculating a component load spectrum for each serial number of the plurality of serial numbers,
    augmenting the load statistics to back fill for corrupt or missing data and,
    applying the reliability factor to the augmented load statistics to identify a desired reliability,
    the component design load spectrum being based on the component load spectrum for each serial number, the desired reliability;
  calculating the component retirement time for the at least one component of the aircraft by utilizing the component design load spectrum by calculating accumulated fatigue damage for each serial number of the plurality of serial numbers and calculating a retirement time and remaining useful life for each serial number of the plurality of serial numbers; and
  retiring the component at the calculated component retirement time.

13. The system of claim 12, wherein the processor configured to perform the estimating of the components loads by operations comprising:
  inputting historical aircraft state parameters and associated measured dynamic loads into a model;
  utilizing the measured dynamic loads to calculate dynamic mode shapes and dynamic mode coefficients associated with the measured dynamic loads and the historical aircraft state parameters;
  tracking aircraft state parameters; and
  estimating dynamic loads based on the aircraft state parameters via the calculated dynamic mode shapes and dynamic mode coefficients to produce the components loads.

14. The system of claim 12, wherein the load statistics correspond to a plurality of components of the aircraft to produce component load statistics.

* * * * *